United States Patent
Jain et al.

(10) Patent No.: US 10,372,996 B2
(45) Date of Patent: Aug. 6, 2019

(54) AUTOMATIC VEHICLE LEAK DETECTION

(71) Applicant: Ford Global Technologies, LLC, Dearborn, MI (US)

(72) Inventors: Jinesh J Jain, Palo Alto, CA (US); Harpreetsingh Banvait, Sunnyvale, CA (US); Bruno Sielly Jales Costa, Sunnyvale, CA (US); Ashley Elizabeth Micks, Mountain View, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/380,930

(22) Filed: Dec. 15, 2016

(65) Prior Publication Data
US 2018/0173961 A1  Jun. 21, 2018

(51) Int. Cl.
*G06K 9/00* (2006.01)
*G06T 7/40* (2017.01)

(52) U.S. Cl.
CPC ............ *G06K 9/00771* (2013.01); *G06T 7/40* (2013.01); *G06T 2207/10004* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 5,974,860 A | 11/1999 | Kuroda et al. | |
| 8,228,381 B2 * | 7/2012 | Accurso | 348/148 |
| 8,605,947 B2 * | 12/2013 | Zhang | G06K 9/00798 348/116 |
| 8,855,849 B1 | 10/2014 | Ferguson | |
| 9,026,303 B1 | 5/2015 | Ferguson et al. | |
| 2009/0276141 A1 | 11/2009 | Surnilla et al. | |
| 2013/0128048 A1 | 5/2013 | Okajima | |
| 2014/0347485 A1 | 11/2014 | Zhang | |

(Continued)

FOREIGN PATENT DOCUMENTS

| | | |
|---|---|---|
| CN | 105182537 A | 12/2015 |
| DE | 102011088167 A1 | 6/2013 |
| EP | 2908203 | 8/2015 |

OTHER PUBLICATIONS

Geraldo L. B. Ramalho, Improving reliability of oil spill detection systems using boosting for high-level feature selection, ACM Digital Library, 2007.

(Continued)

*Primary Examiner* — James M Anderson, II
(74) *Attorney, Agent, or Firm* — David R. Stevens; Stevens Law Group

(57) ABSTRACT

A vehicle controller receives images from a camera upon arrival and upon departure. A location of the vehicle may be tracked and images captured by the camera may be tagged with a location. A departure image may be compared to an arrival image captured closest to the same location as the arrival image. A residual image based on a difference between the arrival and departure images is evaluated for anomalies. Attributes of the anomaly such as texture, color, and the like are determined and the anomaly is classified based on the attributes. If the classification indicates an automotive fluid, then an alert is generated.

15 Claims, 5 Drawing Sheets

(56) References Cited

U.S. PATENT DOCUMENTS

| | | | |
|---|---|---|---|
| 2015/0198455 A1* | 7/2015 | Chen | G01C 21/3629 |
| | | | 701/428 |
| 2015/0211928 A1 | 7/2015 | Itoh | |
| 2015/0332099 A1* | 11/2015 | Kosubek | B60S 1/0844 |
| | | | 348/148 |
| 2016/0101734 A1* | 4/2016 | Baek | B60R 1/00 |
| | | | 348/148 |
| 2016/0275699 A1 | 9/2016 | Lu et al. | |
| 2017/0355081 A1 | 12/2017 | Fisher | |
| 2017/0364756 A1 | 12/2017 | Liebau | |
| 2018/0149551 A1 | 5/2018 | Okajima | |

OTHER PUBLICATIONS

Surveillance System, Leiten, 2014.

* cited by examiner

AUTOMATIC VEHICLE LEAK DETECTION

BACKGROUND

Field of the Invention

This invention relates to the automated detection of vehicle malfunctions.

Background of the Invention

A fluid leak from under the car might often indicate a dangerous situation that requires attention. Prompt detection of the problem can save the car owner up to thousands of dollars in mechanic's services. Vehicle sensors may detect a malfunction due to a fluid leak, but extensive damage may already have occurred.

The apparatus and methods disclosed herein provide an improved approach for detecting a fluid leak form an automobile.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
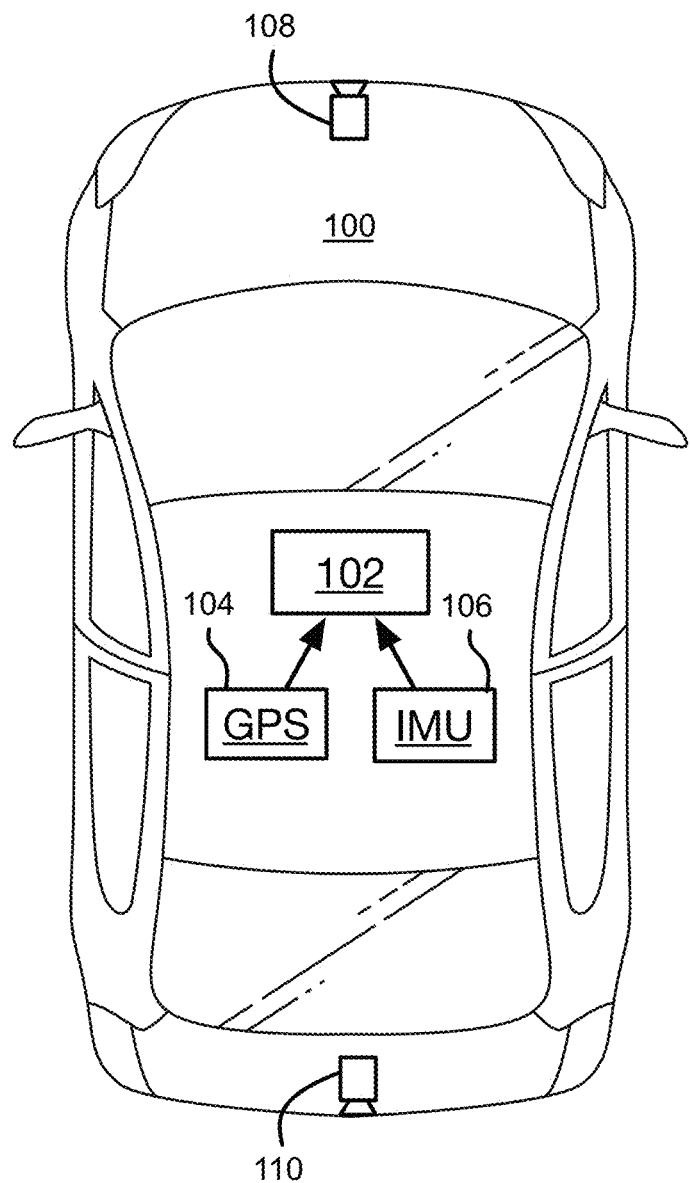
FIG. 1 is a schematic block diagram illustrating a vehicle for which leak detection may be performed in accordance with an embodiment of the present invention.

Referring to FIG. 1, a vehicle 100 may include a controller 102 and one or both of a GPS receiver 104 and an inertial measurement unit (IMU) 106. The controller 102 may use outputs of one or both of the GPS receiver 104 and IMU 106 to determine a position of the vehicle 100. For example, GPS coordinates may be received from the GPS receiver 104 and smaller movements of the vehicle 100 relative to that coordinate may be determined from the IMU 106. In particular, the IMU 106 may be an accelerometer-based device that detects acceleration and resolves it into one or both of velocity and distance measurements.

The vehicle 100 may include one or both of a forward facing camera 108 and a rearward facing camera 110. The methods disclosed herein include evaluating images of a parking location. Inasmuch as most people drive forwardly into a parking spot, a forward facing camera 108 may be preferred. However, for instances where a driver backs into a parking spot, a rearward facing camera 110 may be helpful. For purposes of the following disclosure, forward parking is assumed and only the forward camera 108 is used. However, the methods described herein may be used for rearward parking using the camera 110 in the same manner.

Figure 2:
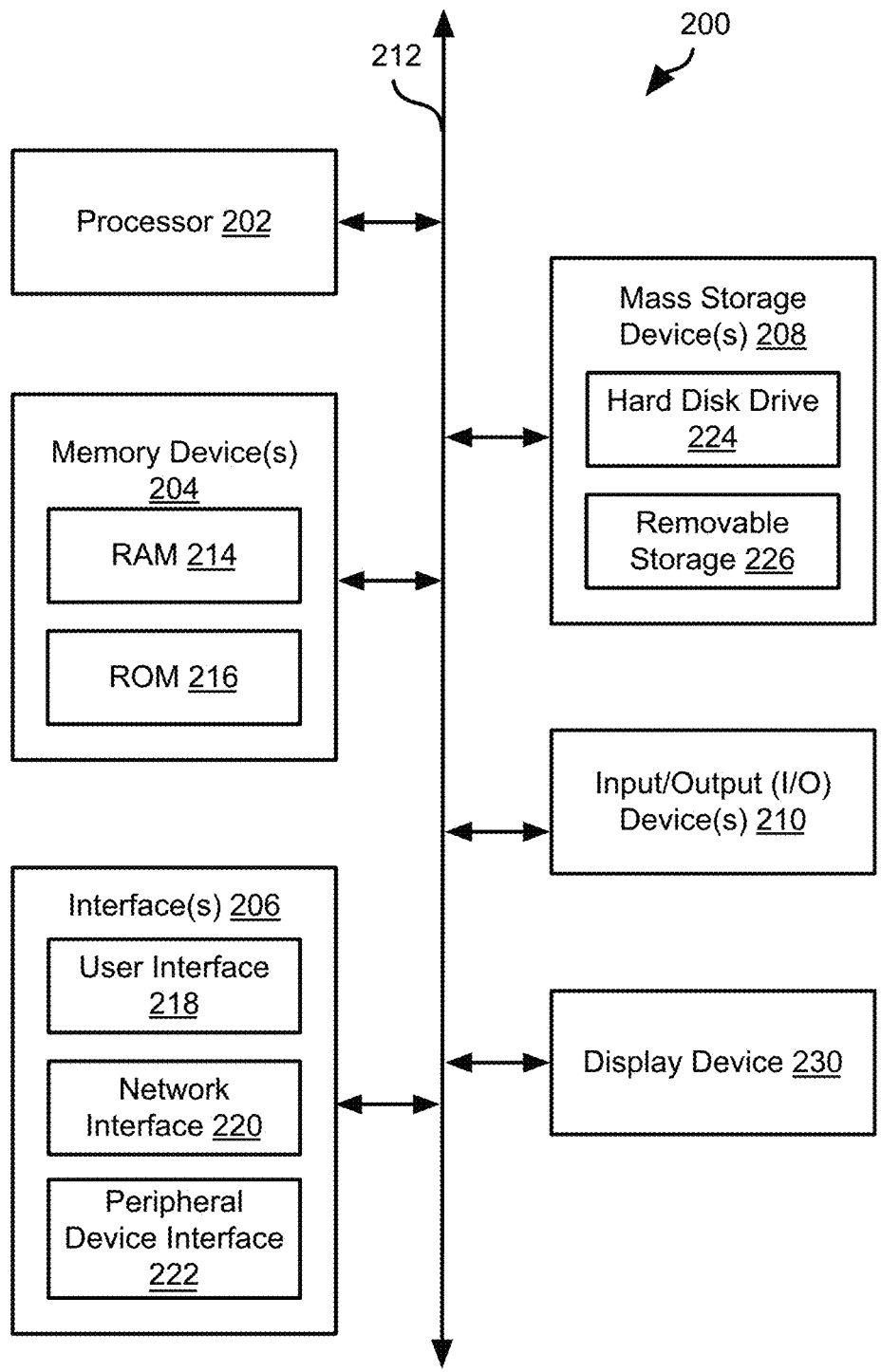
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
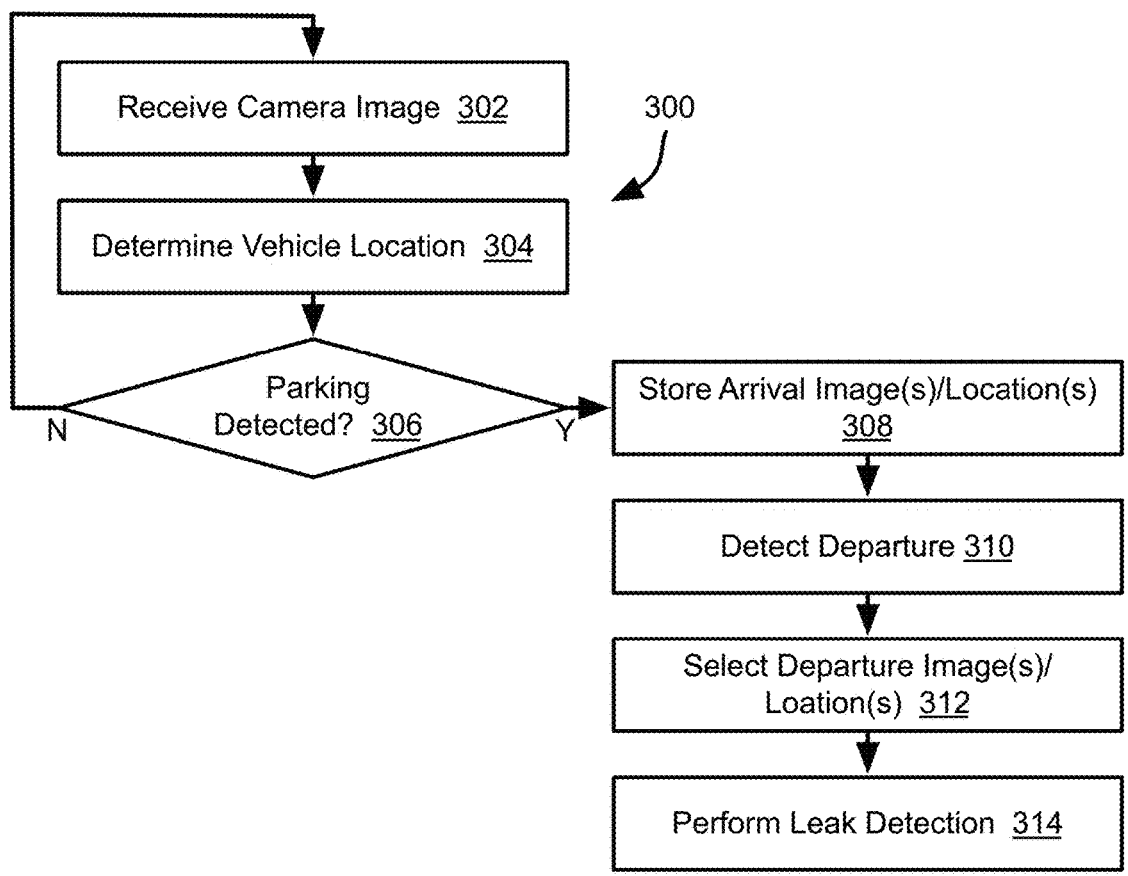
FIG. 3 is a process flow diagram of a method for identifying arrival and departure images in accordance with an embodiment of the present invention.

FIG. 3 illustrates a method 300 that may be executed by the controller 102. In particular, in order to identify leaks, images received from the camera 108 upon arrival at a parking location may be compared to images received from the camera 108 upon departure from the parking location in order to identify changes that may indicate leaked fluid.

For example, the method 300 may include receiving 302 one or more camera images 108. For example, the camera 108 may output a stream of images in the form of a video feed or a series of still images at a given frame rate.

The method 300 may further include determining 304 the location of the vehicle 100. This may include receiving outputs of one or both of the GPS receiver 104 and the IMU 106. The manner in which the location of the vehicle 100 is determined from these outputs may be according to any method for determining location known in the art. For example, a GPS coordinate may be received at a point in time. Movements of the vehicle relative to that coordinate may then be determined based on outputs of the IMU 106.

The images of step 302 may be tagged with the locations of step 304 and temporarily stored in a buffer. Alternatively, an array of images may be stored and an array of locations corresponding to each image may be stored in a separate array.

The method 300 may include determining 306 whether parking was detected. Parking may be detected by detecting cessation of movement of the vehicle 100 for an above-threshold amount of time (e.g. 1 minute or more), removal of the key from the vehicle, exiting of the driver from the vehicle, or arrival at a known parking spot such as the driver's home, place of work, store, or other frequent location. A driver may program the controller 102 to recognize certain locations as parking locations.

In response to detecting 306 parking, the method 300 may include storing 308 one or more arrival images and their corresponding locations from among the images and locations of steps 302, 304. For example, images and locations from step 302, 304 may be temporarily stored such that only the last M images and locations are retained. Upon detecting 306 parking, the arrival images may be selected from these temporarily stored images and corresponding locations. Alternatively, steps 302-304 may be performed upon detecting arrival within some proximity of a known parking location or upon the vehicle slowing to below some threshold speed that indicates potential parking.

For example, a set of the one or more images and their corresponding locations received just prior to cessation of movement at the parking location. The arrival images may be selected such they are images of the surface that will be located beneath the vehicle 100 while parked. For example, where the vehicle has a length L, the arrival images may be selected as the images having corresponding locations within lengths L+B+A and L+B−A from the location of the vehicle 100 when parked. B may be a correction factor that is determined experimentally or mathematically by measuring or determining the distance from the location of the vehicle when parked at which the camera 108 will have the parking location in its field of view. The value of A may be selected such that there is a tolerance or range of distances for which images will be stored 308 as arrival images. For example, an image stabilization process may be performed such that multiple arrival images are needed. Alternatively, the arrival images may be fixed number of N images having locations centered on L+B, having a last image with a location closest to L+B or a first image closest to L+B relative to the locations of other images from steps 302 and 304.

The method 300 may include detecting 310 departure of the vehicle. This may include detecting starting of the vehicle and commencement of movement of the vehicle. The method 300 may then include selecting 312 a departure image. The departure image may be selected as having a corresponding location approximately the same as the arrival image, e.g. within 15 cm, preferably within 5 cm, more preferably within 1 cm. As noted above, arrival images may be selected for a location or range of locations. Accordingly, one or more departure images may be selected 312 from a stream of images from the camera 108 having corresponding locations that are closest to the location or range of locations for the arrival images as compared to the locations of other departure images. The manner in which images are captured and tagged with locations following departure may be as described above with respect to steps 302 and 304.

Figure 4:
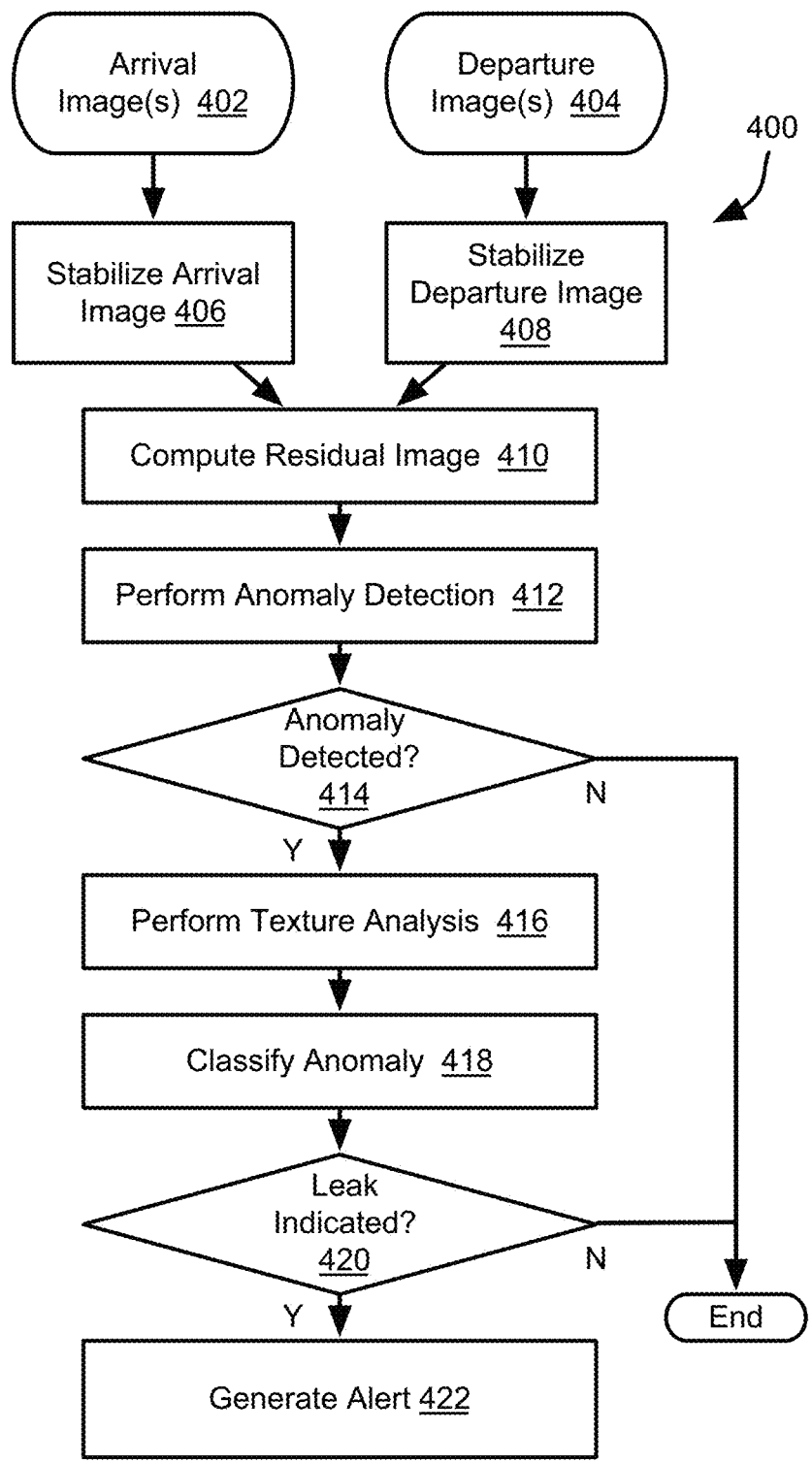
FIG. 4 is a process flow diagram of a method for detecting leaks in accordance with an embodiment of the present invention.

Using the stored one or more arrival images from step 308 and the departure images of step 312, the method 300 may include performing 314 leak detection. Performing 314 leak detection may include executing the method 400 of FIG. 4.

The method 400 takes as inputs the arrival images 402 and departure images 404 and performs image stabilization 406, 408 with respect to each image. In some embodiments, image stabilization is performed by the camera 108. In other embodiments, a series of stored arrival images 402 and departure images 404 are processed by the controller 102 in order to perform 406, 408 image stabilization. Steps 406, 408 may include any image stabilization technique known in the art.

The method 400 then computes 410 a residual image. This may include subtracting the stabilized arrival image from the stabilized departure image. The departure image and arrival image will not be taken from the exact same position. Accordingly, prior to subtraction, the stabilized arrival image and stabilized departure image may be translated relative to one another to compensate for this movement. The manner in which the arrival images and departure images are translated relative to one another may include performing image correlation or any other image analysis technique for determining movement between a pair of images.

Figure 5A:
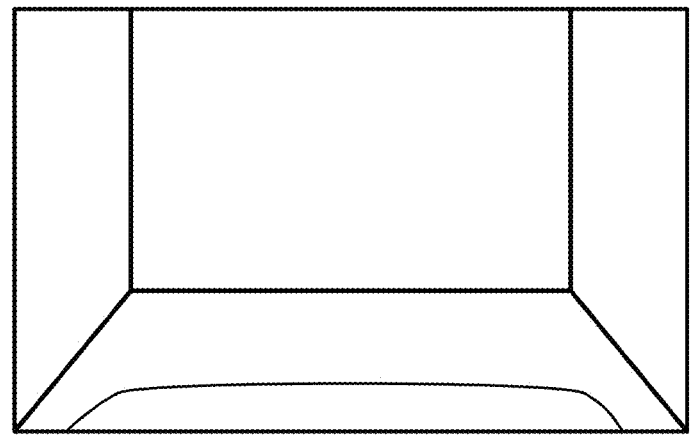
FIGS. 5A to 5C illustrate image processing for leak detection in accordance with an embodiment of the present invention.
Figure 5B:
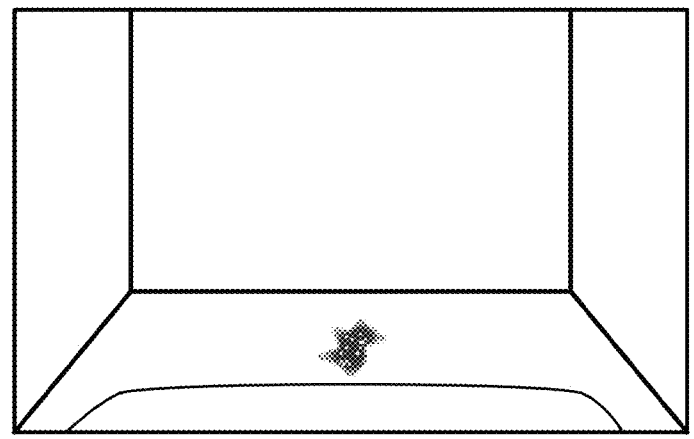
Figure 5C:
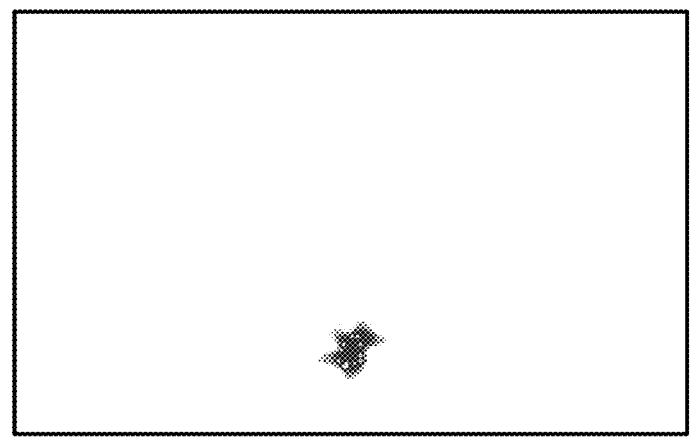

The method 400 may then include performing 412 anomaly detection with respect to the residual image. For example, referring to FIGS. 5A to 5C. A representation of a stabilized arrival image is shown in FIG. 5A and a representation of a stabilized departure image is shown in FIG. 5B. The residual image based on these images is shown in FIG. 5C. As is apparent in FIG. 5C, a fluid stain is present that may indicate a fluid leak. The manner in which the residual image is analyzed to identify differences may include any image processing computational techniques known in the art. In some embodiments, the residual image may be processed by a machine learning algorithm trained to identify fluid leaks.

If an anomaly is found 414 to be present, the method 400 may include performing 416 texture analysis and attempting to classify 418 the anomaly. Texture analysis may include identifying attributes such as color, reflectivity, and density of the anomaly. The attributes may then be used to classify 418 the anomaly. For example, a library of automotive fluids may be accessed by the controller that lists values or ranges of possible values for these attributes. Where the values for attributes identified by the texture analysis match those of an automotive fluid, that fluid may be determined to constitute the anomaly.

In some embodiments, the machine learning algorithm may be trained to identify fluid leaks by receiving training sets of arrival and departure images and an indicator of whether a fluid leak is present as a desired output. In such embodiments, step 410 may be omitted and the stabilized arrival and departure images may be input to the machine learning algorithm, which will then output a classification of any anomaly detected as being a particular automotive fluid or not. In such embodiments, steps 414-418 may be performed by the machine learning algorithm rather than as separate steps.

Where the classification is found 420 to be an automotive fluid, an alert may be generated 422. The alert may include illuminating a "check engine" light, displaying a textual message on a screen of an in-vehicle infotainment system, transmitting a message to a mobile phone of a driver, or other type of alert. The alert may include the classification of the type of fluid from step 418. The alert may indicate an amount of the fluid, such as determined from an area of the anomaly detected at step 414. Using the area of the anomaly and a viscosity of the detected fluid, the volume of leaked fluid may be determined. Using the elapsed time between arrival and departure and the volume, a rate of leakage may be determined. Using a known volume of the fluid in the vehicle, such as the volume of a reservoir holding the fluid or the manufacturer's recommendation for the volume of the fluid, the time until the fluid will be gone or reach a critical level may be determined from the leakage rate. The time until the level of the fluid is critical may be included in the alert.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method comprising, by a vehicle controller:
  receiving a stream of images from a forward facing camera, each image of the stream of images being received at a vehicle location;
  storing the image stream as stored images such that each image of the stream of images is stored as a stored image tagged with the vehicle location at which the each image was received;
  detecting parking of the vehicle;
  in response to detecting parking of the vehicle:
    detecting a parked location of the vehicle; and
    identifying an arrival image from the stored images from the stream of images as being received prior to detecting parking of the vehicle and having the vehicle location with which the arrival image is tagged at a predetermined distance from the parked location;
  detecting departure of the vehicle from the parked location;
  in response to detecting departure of the vehicle from the parked location:
    identifying a departure image in the image stream received after departure and having the vehicle location at which the each image was received within a threshold distance from the vehicle location with which the arrival image is tagged;
  identifying an anomaly according to an evaluation of the arrival image and the departure image by evaluating a representation of a surface located under the vehicle while parked and that is visible in the arrival image and the departure image; and
  determining that the anomaly indicates a fluid leak.

2. The method of claim 1, wherein identifying the anomaly according to the evaluation of the arrival image and the departure image comprises:
  generating a residual image according to a difference between the arrival image and the departure image; and
  identifying the anomaly according to analysis of the residual image.

3. The method of claim 2, wherein identifying the anomaly according to the evaluation of the arrival image and the departure image comprises:
  performing image stabilization on a first output of the camera to obtain the arrival image; and
  performing image stabilization on a second output of the camera to obtain the departure image.

4. The method of claim 1, wherein determining that the anomaly indicates the fluid leak comprises performing texture analysis of the anomaly.

5. The method of claim 4, wherein determining that the anomaly indicates the fluid leak comprises classifying a result of the texture analysis of the anomaly.

6. The method of claim 1, wherein identifying the anomaly according to the evaluation of the arrival image and the departure image comprises evaluating the arrival image and departure image by a machine learning algorithm.

7. The method of claim 1 further comprising determining the vehicle location for each image of the stream of image by receiving a global positioning (GPS) coordinate from a GPS receiver and movement information from an inertial measurement unit (IMU).

8. The method of claim 1, further comprising generating an alert in response to determining that the anomaly indicates a fluid leak.

9. A vehicle comprising:
  a camera, the camera being forward facing;
  a vehicle component containing a fluid;
  a controller operably coupled to the camera, the controller programmed to—
    receive an image stream from the camera, each image of the image stream being received at a vehicle location;
    storing the image stream as stored images such that each image of the image stream is stored as a stored image tagged with the vehicle location at which the each image was received;
    detect parking of the vehicle;
    in response to detecting parking of the vehicle at a parking location:
      identify a set of arrival images from the stored images that were received before detecting parking of the vehicle and that are tagged with vehicle locations in a region about a predetermined distance from the parking location;
    detect departure of the vehicle from the parking location;

in response to detecting departure of the vehicle from the parking location, identify a set of departure images from the image stream that were received after detecting departure of the vehicle and received at vehicle locations corresponding to the vehicle locations with which the set of arrival images are tagged;

stabilize the set of arrival images to obtain a stabilized arrival image;

stabilize the set of departure images to obtain a stabilized departure image evaluate whether (a) the stabilized arrival image and the stabilized departure image indicate an anomaly at the parking location on a surface located under the vehicle while parked;

evaluate whether (b) the anomaly indicates a fluid leak;

if (b), generate an alert.

10. The vehicle of claim 9, wherein the controller is programmed to evaluate (a) by:

generating a residual image according to a difference between the stabilized arrival image and the stabilized departure image; and evaluate (c) whether the residual image indicates the anomaly.

11. The vehicle of claim 9, wherein the controller is further programmed to evaluate (b) by performing texture analysis of the anomaly.

12. The vehicle of claim 11, wherein the controller is further programmed to evaluate (b) by classifying a result of the texture analysis of the anomaly.

13. The vehicle of claim 9, wherein the controller is further programmed to evaluate (a) by evaluating the stabilized arrival image and the stabilized departure image by a machine learning algorithm.

14. The vehicle of claim 9, further comprising a global positioning system (GPS) receiver and an inertial measurement unit (IMU), the controller programmed to determine the vehicle location for each image in the image stream from outputs of the GPS receiver and the IMU.

15. The vehicle of claim 9, wherein the vehicle component is at least one of an engine, transmission radiator, power braking system, and power steering system.

* * * * *